(12) United States Patent
Chen et al.

(10) Patent No.: US 10,652,115 B1
(45) Date of Patent: May 12, 2020

(54) MULTI-SOURCE NETWORK TRAFFIC ANALYSIS TOOL

(71) Applicant: Amazon Technologies, Inc., Seattle, WA (US)

(72) Inventors: Po-Chun Chen, Oak Hill, VA (US); Hassan Ahmed, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 263 days.

(21) Appl. No.: 15/236,099

(22) Filed: Aug. 12, 2016

(51) Int. Cl.
*H04L 12/26* (2006.01)

(52) U.S. Cl.
CPC ............ *H04L 43/062* (2013.01); *H04L 43/16* (2013.01); *H04L 43/18* (2013.01)

(58) Field of Classification Search
CPC ....... H04L 43/18; H04L 43/16; H04L 43/062; H04L 12/26
USPC ....................................................... 370/253
See application file for complete search history.

(56) References Cited

U.S. PATENT DOCUMENTS

| | | | |
|---|---|---|---|
| 7,356,585 B1* | 4/2008 | Brook | H04L 63/1416 709/224 |
| 9,141,947 B1* | 9/2015 | Furr | G06Q 20/102 |
| 9,591,018 B1* | 3/2017 | Zakian | G06F 21/552 |
| 9,652,326 B1* | 5/2017 | Bauer | G06F 11/2025 |
| 2003/0198190 A1* | 10/2003 | Rajan | H04L 43/08 370/252 |
| 2013/0282897 A1* | 10/2013 | Siegel | H04L 43/0876 709/224 |
| 2013/0329584 A1* | 12/2013 | Ghose | H04L 45/586 370/252 |
| 2014/0016482 A1* | 1/2014 | de Silva | H04L 43/026 370/250 |
| 2014/0192645 A1* | 7/2014 | Zhang | H04L 47/12 370/235 |
| 2015/0365328 A1* | 12/2015 | Luke | H04L 47/125 370/238 |
| 2015/0381459 A1* | 12/2015 | Xiao | H04L 43/0894 370/253 |

OTHER PUBLICATIONS

U.S. Appl. No. 14/981,677, filed Dec. 28, 2015, Po-Chun Chen, et al.
U.S. Appl. No. 14/549,432, filed Nov. 20, 2014, Christopher Samuel Zakian, et al.

* cited by examiner

*Primary Examiner* — Jae Y Lee
*Assistant Examiner* — Jean F Voltaire
(74) *Attorney, Agent, or Firm* — Robert C. Kowert; Kowert, Hood, Munyon, Rankin & Goetzel, P.C.

(57) ABSTRACT

A system includes a provider network comprising resources of the provider network implemented on computing devices of the provider network and multiple networking devices. The networking devices are connected via physical network paths within the provider network. The system includes a traffic analyzer that receives at least two different sets of traffic information comprising different types of traffic measurements. The traffic analyzer determines traffic flowrates for the network paths of the provider network and/or a dedicated physical network path between the provider network and the customer network based on the at least two different sets of traffic information.

22 Claims, 10 Drawing Sheets

MULTI-SOURCE NETWORK TRAFFIC ANALYSIS TOOL

BACKGROUND

Many companies and other organizations operate computer networks that interconnect numerous computing systems to support their operations and the services they provide to their end customers distributed worldwide. For example, data centers housing significant numbers of interconnected computing systems have become commonplace, such as private data centers that are operated by and on behalf of a single organization, and public data centers that are operated by entities as businesses to provide computing resources to customers. In many cases providers set up large networks that may logically span several regions, countries, or even continents, and may include numerous data centers with varying levels of services and facilities available, utilized together, to provide a unified set of services to their end customers.

In some data centers that have been set up to provide computing and/or storage facilities to remote clients, a set of computational resources at the data center may be dynamically divided into resource pools, with each pool being made available for exclusive use by a given client for designated periods of time. There are a number of alternatives available for how the consumers of these facilities establish network connectivity to the resource pools that have been designated for their use. Resources that have been designated for use by a particular consumer may be referred to herein as resources that have been provisioned to a client or customer. Customers may originate requests from a wide variety of devices—desktop personal computers, laptops, client-office servers, tablets, smart phones and the like. These devices may use either long-lasting network links (e.g., using a client office network with a T1 connection) to communicate with their proximate network and/or the public Internet, or they may have transient connectivity (e.g., in the case where the customer uses a mobile smart phone). The proximate networks to which the customer devices are directly connected may in turn route request traffic to the provider network's data centers over a wide variety of paths of a provider network. Such paths in many cases may include backbone paths linking data centers within a region of a provider network, backbone paths linking different regions of a provider network, or backbone paths providing other connections within a provider network.

For some casual types of service requests, such as a request from a customer to read a recent news article from a web-based news provider, a reasonable variation in responsiveness and an occasional dropped connection may be acceptable. However, for many business-related data transmissions more stringent performance, reliability and security needs may exist. In such environments, a customer of the provider network may need a greater level of network isolation and control than is generally available over the public Internet. For example, the customer may wish to establish, if possible, dedicated physical network paths between the customer's own client network and the provider network, such that the only traffic transmitted over those paths is traffic generated on behalf of the customer and in accordance with policies established by the customer.

Adding additional capacity to backbone paths within a provider network or to dedicated physical network paths between a customer's client network and a provider network may involve considerable expense and time to implement. In some cases, a lack of traffic flowrate information, inaccurate traffic flowrate information, or incomplete traffic flowrate information may lead to poor capacity planning decisions.

Figure 1:
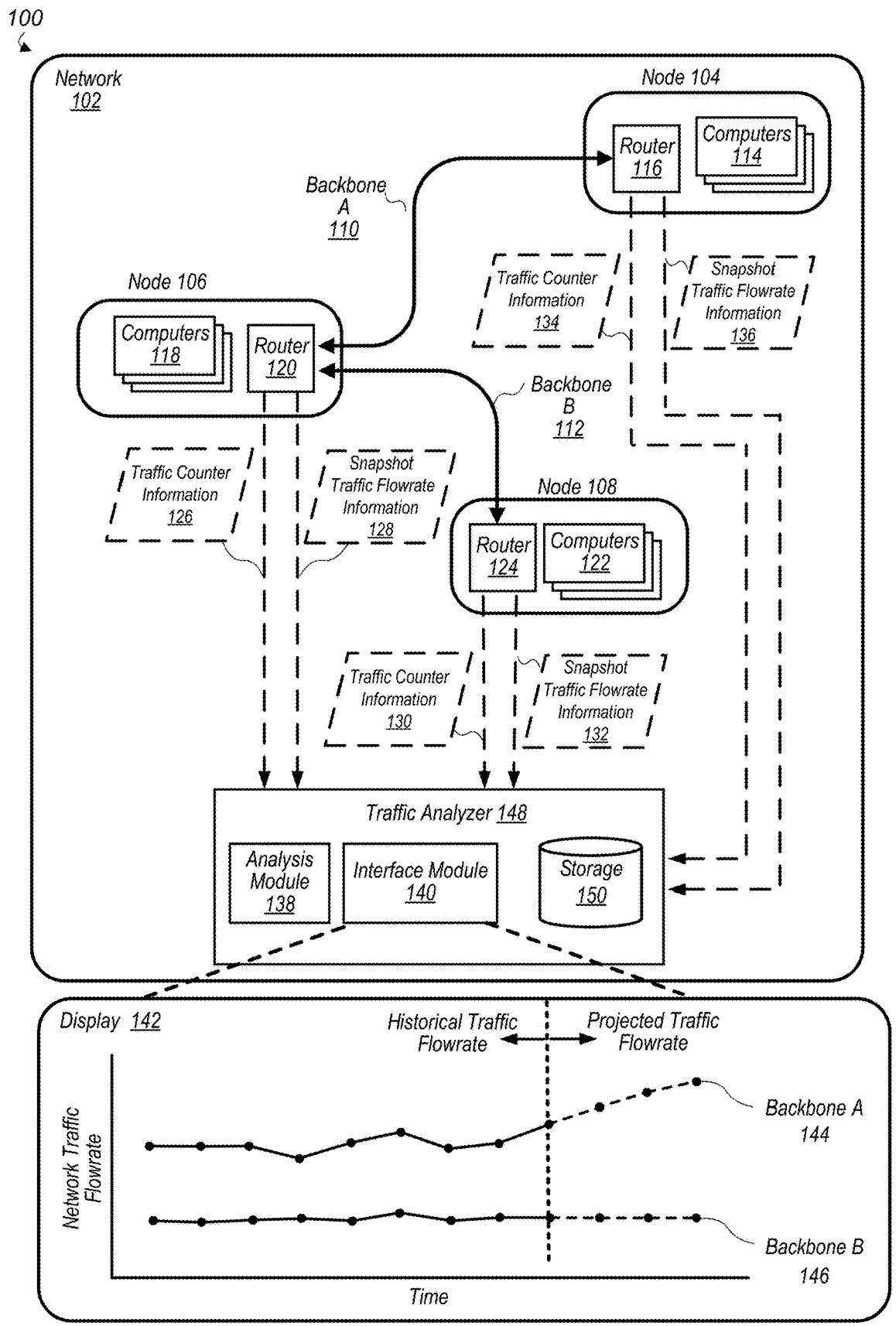
FIG. 1 illustrates system environment that includes a provider network that includes multiple nodes connected by backbone paths and a traffic analyzer configured to determine traffic flowrates on the backbone paths of the provider network, according some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatuses for analyzing network traffic are described.

Networks set up by an entity such as a company or a public sector organization to provide one or more services accessible via the Internet (such as various types of cloud-based computing or storage) to a distributed set of clients may be termed provider networks in this document. Such a provider network may include numerous data centers hosting various resource pools, such as collections of computer servers, storage devices, networking equipment and the like, needed to implement and distribute the services offered by the provider.

Such provider networks may include dedicated physical network paths between portions of the provider network, such as dedicated physical network paths between data centers of a provider network. These dedicated physical network paths may be termed backbone paths in this document. In addition, in some embodiments, a provider network may include multiple data centers organized into availability zones and regions, wherein each region includes multiple availability zones, and each availability zone includes one or more data centers. Backbone paths may connect data centers within an availability zone with other data centers in the availability zone and may connect data centers in a given availability zone or region with other data centers in other availability zones or other regions. In some embodiments, each region may include a transit center that comprises networking devices, such as routers and switches, configured to coordinate network communication between multiple regions of a provider network. In some embodiments, a transit center may coordinate network traffic between a particular region in which the transit center is located and other regions of the provider network, peer networks, customer networks, IP transit services, or may coordinate other types of network traffic.

Also, in order to extend the geographical areas over which its services can be accessed with desired levels of performance, reliability and security, an operator of a provider network may establish dedicated private network paths between its data centers or transit centers and one or more routers that are physically located at a facility remote from the data centers. Such dedicated private network paths may be termed direct connect paths in this document. In some embodiments, a router included in a transit center may be an edge router. For example, only traffic that has passed through a device owned or managed by the provider network operator, and therefore complies with policies set by the provider network operator, may be allowed on the private paths between the router included in the transit center and other components of the provider network.

A transit center router of a provider network may be connected to a client-side router of a client network via a direct connect path between the provider network and the client network. In contrast to the public internet, direct connect paths between a provider network and a client network may be restricted such that only communications between the provider network and client networks are transmitted over these dedicated physical paths. For example, a direct connect path may include a dedicated fiber optic cable that connects a client network to a provider network and that is not shared with the public. In some embodiments, a direct connect path may only transmit communications between a single client network and a provider network and not be shared with other customers of the provider network. In some embodiments a direct connect path may transmit communications between multiple customers of a provider network and the provider network, but may not be available for use by non-customers.

In some embodiments, provider networks may include multiple backbone paths and multiple direct connect paths. Monitoring network traffic through such provider networks may be complex due to the multiple paths included in the provider network and due to a lack of network traffic information. In addition, as additional customers utilize services of a provider network and as existing customers of a provider network increase network activity, demand on backbone paths and direct connect paths of the provider network may increase. In some situations, especially for backbone paths or direct connect paths stretching across long geographical distances, it may take a considerable amount of time to add additional capacity to respective backbone paths and/or direct connect paths. In some circumstances demand may grow such that capacity upgrade projects need to be initiated well in advance of backbone path capacity or direct connect path capacity actually being exhausted. For example, demand may increase at a rate such that capacity improvement projects have to be initiated months or even a year before network traffic demand actually reaches a current network traffic capacity of a backbone path or a direct connect path in order to provide uninterrupted services to customers. In some embodiments, a traffic analyzer may provide an accurate method to track network traffic flow through backbone paths and direct connect paths. Also, a traffic analyzer may provide the ability to accurately project future network traffic flows through backbone paths and direct connect paths of a provider network. In some embodiments, accurate network traffic flowrate information provided by a traffic analyzer may allow a provider network and/or customers of the provider network to identify differences between traffic flows in direct connect paths used by a customer to improve network availability risks for the customer. Also, in some embodiments a traffic analyzer may provide accurate network traffic flowrate information that can be used to project possible impacts on provider network traffic flows due to changes in services provided by the provider network such as addition of a new service offered by the provider network.

In some embodiments, in order to provide accurate network traffic flowrate information, a traffic analyzer may utilize multiple independently measured sets of traffic information describing a particular traffic flow over a particular physical network path over a particular time period. For example, a traffic analyzer may receive traffic flowrate information from a traffic counter associated with a particular physical network path and may also include a snapshot flowrate measurement from a traffic meter associated with the physical network connection. In some embodiments, the traffic counter and the traffic meter may be implemented on a router associated with the physical network path. For example, a traffic counter may accumulate a running count of a number of bytes, or packets that have passed through the router on a given physical network path connected to the router. The router may also include a traffic meter that periodically takes a snapshot of a current network traffic flowrate through the router for traffic flowing on the given physical network path. In some embodiments, a traffic analyzer may poll the router to receive a current traffic counter reading and may poll the router to receive a current snapshot traffic flowrate reading for a given physical network path.

For example, at a particular moment in time, a traffic analyzer may poll a router and receive a current traffic counter reading. The traffic analyzer may allow a period of time to elapse and poll the router an additional time to receive another current traffic counter reading at a subsequent time after the period of time has elapsed. In addition, the traffic analyzer may poll a traffic meter implemented on the router to provide a snapshot traffic flowrate reading at an instant in time taking place during the elapsed amount of time between sequential traffic counter readings. The traffic analyzer may determine a difference between sequential traffic counter readings and divide the difference between sequential traffic counter readings by the elapsed amount of time to determine an average flowrate of traffic on the physical network path during the period of time. Also, the traffic analyzer may adjust the average traffic flowrate based on the snapshot traffic flowrate received during the elapsed period of time. In some embodiments, a traffic analyzer may select between the average flowrate determined based on traffic counter information and the instantaneous flowrate based on snapshot traffic flowmeter information. In addition, a traffic analyzer may include domain specific information with a determined traffic flowrate such that a determined traffic flowrate value is associated with a particular physical network path or direct connect path. In some embodiments, a traffic analyzer may be configured to perform various traffic analyses such as determining a traffic flowrate on respective ones of multiple backbone paths and direct connect paths of a provider network for multiple periods of time, and determining percentages of direct connect related traffic that is flowing on various ones of multiple backbone paths of a provider network.

According to one embodiment, a system includes a provider network that includes multiple computing devices configured to implement resources of the provider network. The system also includes multiple network devices, such as routers and switches, and multiple physical network paths, such as backbone paths and/or direct connect paths, each connecting respective sets of the networking devices. The system also includes a traffic analyzer configured to receive a first set of traffic information from two or more of the network devices, wherein the first set of traffic information comprises a first type of traffic measurements for traffic flowing via one or more of the physical network paths, such as traffic counter information for traffic flowing via one or more backbone paths. The traffic analyzer is also configured to receive a second set of traffic information from the two or more network devices, wherein the second set of traffic information comprises a second type of traffic measurements for traffic flowing via the one or more physical network paths, such as snapshot traffic meter information for traffic flowing via one or more backbone paths. The first type of network traffic measurements and the second type of network traffic measurements comprise different types of network traffic measurements. For example, the first type of network traffic measurements may include traffic counter measurements and the second type of network traffic measurement may include snapshot traffic meter flowrate measurements. In addition, the traffic analyzer is configured to determine, for a given time interval and for respective ones of the physical network paths, respective amounts of network traffic flowing via the respective physical network paths based on the first and second set of traffic information; and generate, for display or storage, respective values for the respective amounts of network traffic flowing via the respective physical network paths. For example, the traffic analyzer may be configured to generate for storage or display multiple traffic flowrate values each corresponding to a particular time period and a particular physical network path, such as a particular backbone path or a particular direct connect path.

According to one embodiment a traffic analyzer includes one or more computing devices configured to receive a first set of traffic information from a set of two or more network devices of a network, wherein the first set of traffic information comprises a first type of traffic measurements for traffic flowing via one or more physical network paths of the network. The traffic analyzer is also configured to receive a second set of traffic information from the set of two or more network devices, wherein the second set of traffic information comprises a second type of traffic measurements for traffic flowing via the one or more physical network paths of the network, wherein the first type of network traffic measurements and the second type of network traffic measurements include different types of traffic measurements. The traffic analyzer is further configured to determine, for a given time interval and for respective ones of the one or more physical network paths, respective amounts of network traffic flowing via the respective physical network paths of the network based on the first set of set of traffic information and based on the second set of traffic information. The traffic analyzer is also configured to generate, for display or storage, values for the respective amounts of network traffic flowing via the respective physical network paths for the given time interval.

According to one embodiment, a method includes receiving a first set of traffic information from a set of two or more network devices of a network, wherein the first set of traffic information comprises a first type of traffic measurements for traffic flowing through one or more physical network paths and receiving a second set of traffic information from the set of two or more network devices, wherein the second set of traffic information comprises a second type of traffic measurements for traffic flowing through the one or more physical network paths, wherein the first type of network traffic measurements and the second type of network traffic measurements include different types of traffic measurements. The method further includes determining, for a given time interval and for respective ones of the one or more physical network paths, respective amounts of network traffic flowing via the respective physical network paths based on the first set of traffic information and based on the second set of traffic information.

Example System Environment

FIG. 1 illustrates system environment that includes a provider network that includes multiple nodes connected by backbone paths and a traffic analyzer configured to determine traffic flowrates on the backbone paths of the provider network, according some embodiments.

System 100 includes a provider network, such as network 102. Network 102 includes nodes 104, 106, and 108. Node 104 includes computers 114 and router 116. Computers 114 may include data servers, storage servers, network switches, or various other types of computing devices and may be organized in a network within node 104 and be connected via the network of node 104 with router 116 of node 104. In a similar manner node 106 includes computers 118 connected with router 120, and node 108 includes computers 122 connected with router 124. In addition, backbone A 110 connects router 120 of node 106 with router 116 of node 104. In some embodiments, backbone A 110 may be a dedicated physical path such as a fiber optic, copper, or other suitable type of cable. In a similar manner backbone B 112 connects router 120 of node 106 with router 124 of node 108.

System 100 also includes traffic analyzer 148. In FIG. 1 traffic analyzer 148 is illustrated as being within network 102. In some embodiments, a traffic analyzer, such as traffic analyzer 148, may be implemented on computers of a network and the traffic analyzer may monitor network traffic flowing through the network that includes the computers that implement the traffic analyzer. For example, in some embodiments traffic analyzer 148 may be implemented on one or more of computers 114, 118, or 122. In some embodiments, a traffic analyzer, such as traffic analyzer 148, may be implemented on computing devices remote from a network that the traffic analyzer monitors. For example, in some embodiments, traffic analyzer 148 may be implemented on computing devices remote from network 102.

In some embodiments, a traffic analyzer may receive multiple sets of traffic information from network devices of a network that the traffic analyzer monitors. The sets of traffic information may include traffic measurements measured via different measurement methods and that indicate different types of network traffic measurements. For example, one set of traffic information may indicate traffic measurements from a traffic counter that counts bytes or packets flowing through a particular physical network path, such as backbone A 110 or backbone B 112. The traffic counter measurements may be separated by a period of time. A second set of traffic information may indicate traffic measurements from a traffic meter that provides snapshot traffic flowrates at an instant in time when the snapshot traffic flowrate is obtained. For example, a snapshot traffic flowrate may indicate an amount of traffic flow on backbone A 110 or on backbone B 112 at a particular instant in time. In some embodiments, traffic counter measurements and traffic meter snapshot measurements may be coordinated such that snapshot measurements are obtained during a period of time between obtaining traffic counter measurements. For example, traffic counter measurements may be taken every 5 minutes and during a 5 minute period of time between sequential traffic counter measurements, a snapshot measurement may be taken to determine a traffic flowrate during the elapsed time between traffic counter measurements. Snapshot traffic flowrate measurements may validate traffic counter measurements, may be used to replace missing traffic counter measurements, may be used to adjust traffic counter measurements, or may be used in various other ways to increase accuracy or reliability of traffic measurements.

For example, at a first moment in time, traffic counter information 126, 130, and 134 may be received from routers 116, 120, and 124. The traffic counter information may indicate a current measurement of traffic counters associated with routers 116, 120, and 124. For example a traffic counter of router 116 may indicate 100 packets have passed over backbone A 110 since the last time the traffic counter was reset. This may be included in traffic counter information 134. At a subsequent moment in time after a period of time has elapsed (for example 5 minutes later), the traffic counter associated with router 116 may indicate that 200 packets have passed over backbone A 110. During the period of time (for example the 5 minutes) a snapshot traffic flowrate may be obtained for traffic passing through backbone A 110. For example, at 2.5 minutes a snapshot may be obtained indicating a traffic flowrate of 10 packets per minute. An analysis module of a traffic analyzer, such as analysis module 138 may determine an average traffic flow during the period of time by subtracting the traffic counter measurement at the beginning of the period of time from the traffic counter measurement at the end of the period of time and dividing the difference by the period of time. For example, 200 packets minus 100 packets divided by 5 minutes may indicate an average traffic flowrate over the period of time of 20 packets per minute e.g. 200−100=100, and 100/5=20. The traffic analysis module, such as traffic analysis module 138, may compare the determined average traffic flowrate to the snapshot traffic flowrate. For example, the snapshot traffic flowrate of 10 packets per minute may be compared to the average traffic flowrate of 20 packets per minute. Note that traffic flowrates of 10 packets per minute and 20 packets per minute are used only as examples for ease of illustration. In actual practice, traffic flowrates may be significantly greater than the examples used herein.

In some embodiments, a traffic analysis module, such as traffic analysis module 138, may select the larger value between the determined average traffic flowrate and the snapshot traffic flowrate to represent a traffic flowrate for the period of time. In some embodiments, an average traffic flowrate may be adjusted up or down based on a snapshot traffic flowrate. For example, a snapshot traffic flowrate that is considerably higher than an average traffic flowrate may indicate that traffic flow on the physical network path includes traffic spikes. For capacity planning purposes, a conservative measurement may be based on snapshot traffic flowrate measurements to include the traffic spikes in traffic flowrate value for the period of time to ensure enough capacity is planned for the physical network path. In other embodiments, an average traffic flowrate may be adjusted to a value less than a snapshot traffic flowrate but greater than the average flowrate value. Such an approach may provide a more accurate traffic flow measurement than the average traffic flow measurement or the snapshot traffic flowrate measurement. A traffic analyzer may store a determined traffic flowrate value for a particular physical network path for a particular period of time in a storage and may determine a traffic flowrate value for another particular physical network path for the particular time period, or may advance to determining traffic flowrate values for a next time period for one or more physical network paths.

In some embodiments, a traffic analyzer, such as traffic analyzer 148, may poll one or more routers for traffic counter information and for snapshot traffic flowrate information. For example, each of routers 116, 120, and 124 may include traffic counters and traffic meters associated with the respective routers. Traffic analyzer 148 may send a request to each of the traffic counters and traffic meters to request traffic counter information and snapshot traffic flowrate information. In response the traffic counters and traffic meters may provide traffic counter information, such as traffic counter information 126, 130, and 134, and snapshot traffic flowrate information, such as snapshot traffic flowrate information 128, 132, and 136, to traffic analyzer 148. In some embodiments, a traffic analyzer, such as traffic analyzer 148, may poll routers for snapshot traffic information during an elapsed period of time between polling routers for traffic counter information. Polling routers for traffic counter information at spaced time intervals and polling routers for snapshot traffic flowrate information during the spaced time intervals and comparing an average traffic flowrate based on the counter traffic information with an instantaneous snapshot traffic flowrate may provide more accurate results than determining traffic flowrate values solely based on counter information or than determining traffic flowrates values solely based on snapshot traffic flowrate information. For example, if traffic flowrates vary considerably snapshot traffic flowrate information may not be accurate because the snapshot may be taken during a peak or a valley. In a similar manner, when traffic flowrates vary considerably, average traffic flowrates determined solely based on counter traffic information may be inaccurate because the average may not indicate traffic spikes taking place during a period of time between traffic counter measurements. Also, overhead processing costs for routers may be reduced as compared to continuous traffic monitoring because a traffic analyzer, such as traffic analyzer 148, may poll a router for counter traffic information or snapshot traffic flowrate information at spaced time intervals as opposed to continuously polling the router for traffic flowrate information. Thus a traffic analyzer, such as traffic analyzer 148, may provide accurate traffic flowrate information without significantly increasing processing overhead for routers providing traffic information to the traffic analyzer.

In some embodiments, one or more intermediate traffic analysis systems may be included in a network being monitored by a traffic analyzer, such as traffic analyzer 148. For example an intermediate system may collect traffic counter information and/or snapshot traffic flowrate information from routers in a network and a traffic analyzer, such as traffic analyzer 148, may poll the intermediate system for traffic counter information and snapshot traffic flowrate information. In some embodiments, traffic counter information and snapshot traffic flowrate information may be stored in a storage and a traffic analyzer, such as traffic analyzer 148, may obtain traffic counter information and/or snapshot traffic flowrate information from the storage. For example, one or more of computers 114, 118, or 122 may store traffic counter information and/or snapshot traffic flowrate information in a storage.

In some embodiments, a traffic analyzer, such as traffic analyzer 148, may include an interface module, such as interface module 140. An interface module may be configured to generate for display one or more representations of determined traffic flowrate values for physical network paths monitored by a traffic analyzer. For example, interface module 140 is configured to generate display 142 that includes graph 144 indicating traffic flowrates on backbone A 110 and graph 146 indicating traffic flowrates on backbone B 112. In some embodiments, a traffic analysis module may determine one or more trends or patterns in determined traffic flowrate values for a particular physical network path and be configured to generate a projected traffic flow for the particular physical network path based on the determined one or more trends or patterns. For example, display 142 includes historical traffic flowrate values for backbone A 110 and backbone B 112 and includes projected traffic flowrate values for backbone A 110 and backbone B 112.

A traffic analyzer, such as traffic analyzer 148, may monitor traffic on multiple physical network paths in various sizes of networks. For example, nodes 104, 106, and 108 may include individual computing devices and backbones A 110 and B112 may span short distances, or nodes 104, 106, and 108 may include thousands or tens of thousands of computing devices, and backbones A 110 and B112 may span hundreds of miles or around the globe.

Example Environment with Multiple Availability Zones

Figure 2:
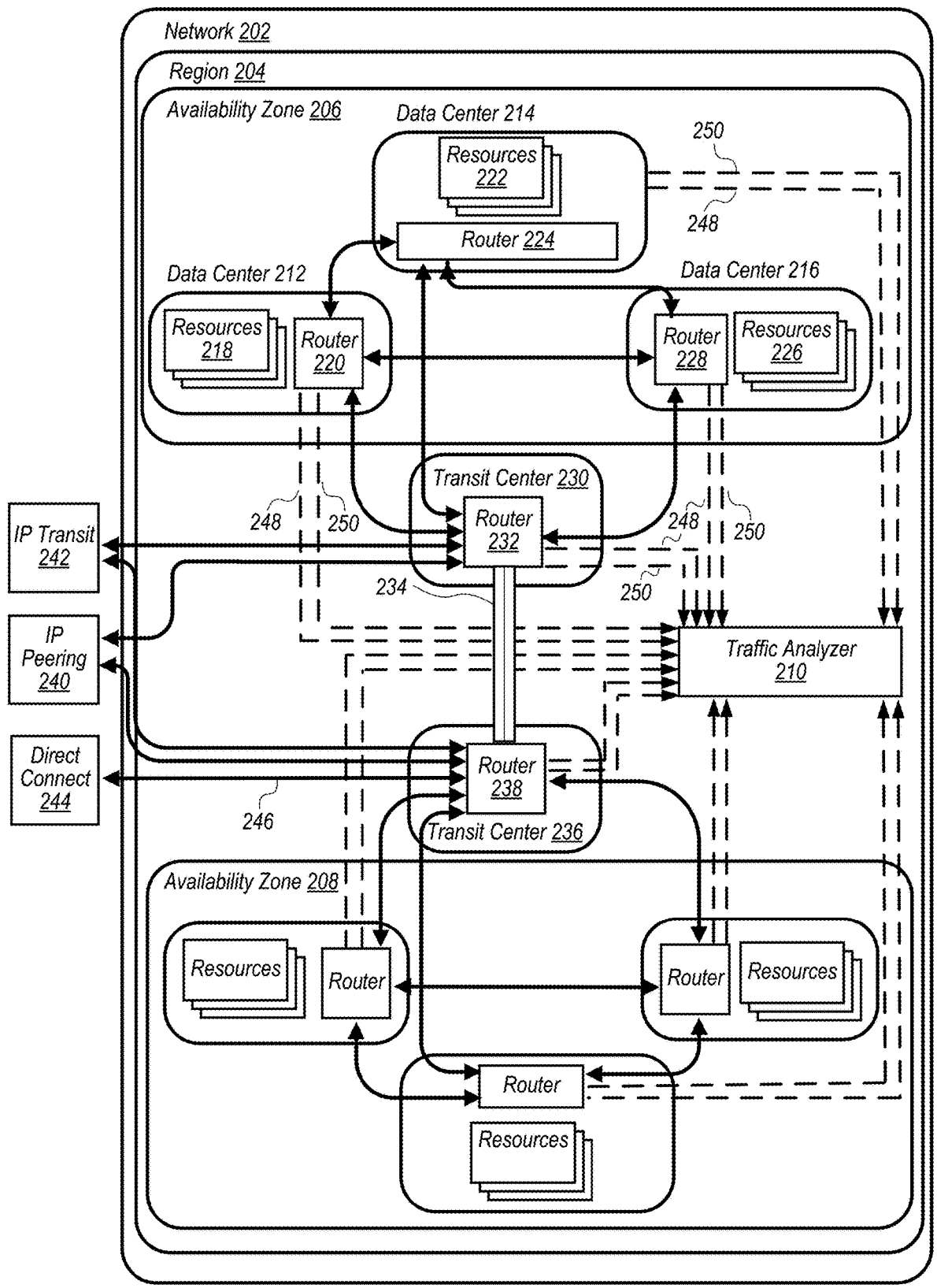
FIG. 2 illustrates a provider network that includes a traffic analyzer that receives traffic information from network devices in multiple availability zones in a region of a provider network and that is configured to determine traffic flowrates on backbone paths of the provider network, according to some embodiments.

FIG. 2 illustrates a provider network that includes a traffic analyzer that receives traffic information from network devices in multiple availability zones in a region of a provider network and that is configured to determine traffic flowrates on backbone paths of the provider network, according to some embodiments.

Network 202 includes region 204 which includes availability zones 206 and 208 and traffic analyzer 210. Traffic analyzer 210 may operate in a similar manner as traffic analyzer 148 described in regard to FIG. 1. Region 204 includes two availability zones, however, a region of a provider network may include any number of availability zones and a traffic analyzer, such as traffic analyzer 210, may monitor network traffic flowrates on physical network paths in any number of availability zones or between any number of availability zones. Each availability zone, may in turn include multiple data centers. For example availability zone 206 includes data centers 212, 214, and 216. Each data center may include resources, such as computing devices, storage devices, networking devices, and the like, along with one or more routers. For example data center 212 includes resources 218 and router 220, data center 214 includes resources 222 and router 224, and data center 216 includes resources 226 and router 228. In some embodiments, an availability zone may be connected to a transit center, such as transit center 230, and a transit center, such as transit center 230, may include one or more routers, such as router 232. Backbone paths may provide a physical connection path between routers in each of data centers 212, 214, 216, and transit center 230. In addition, a transit center, such as transit center 230 may be connected to other transit centers via an intra-region backbone path, such as backbone path 234 between a router of the transit center, such as router 232, and a router of another transit center, such as router 238 of transit center 236.

In addition, a transit center may be connected to other networks via an IP peering arrangement, such as IP peering 240 or may be connected to an IP transit provider, such as IP transit 242. In addition, a router of a transit center may be connected to a router in a customer network via a direct connect dedicated physical connection path between the provider network and the customer network, such as direct connect 244 that is connected to router 238 of transit center 236 via direct connect physical path 246. A traffic analyzer included in a provider network, such as traffic analyzer 210, may receive traffic counter information and snapshot traffic flowrate information from traffic counters and traffic flowmeters implemented on or associated with each of the routers included in an availability zone, region, or overall provider network. For example, traffic analyzer 210 receives traffic counter information 248 and snapshot traffic flowrate information 250 from each of the routers included in network 202. Also, in a similar manner as described in regard to traffic analyzer 148 in FIG. 1, a traffic analyzer, such as traffic analyzer 210, may determine traffic flowrate values for each physical network path 234 included in network 202 based on traffic counter information 248 and snapshot traffic flowrate information 250. Also, a traffic analyzer, such as traffic analyzer 210, may generate a display for displaying traffic flowrate values and projected traffic flowrate values for each physical network path 234 included in network 202, similar to display 142 illustrated in FIG. 1.

In some embodiments, a provider network, such as network 202, may include multiple regions 204 spread out across the country or the world, and a traffic analyzer, such as traffic analyzer 210, may determine traffic flowrate values for physical network paths in the multiple regions and between the multiple regions.

Example Environment with Multiple Regions

Figure 3:
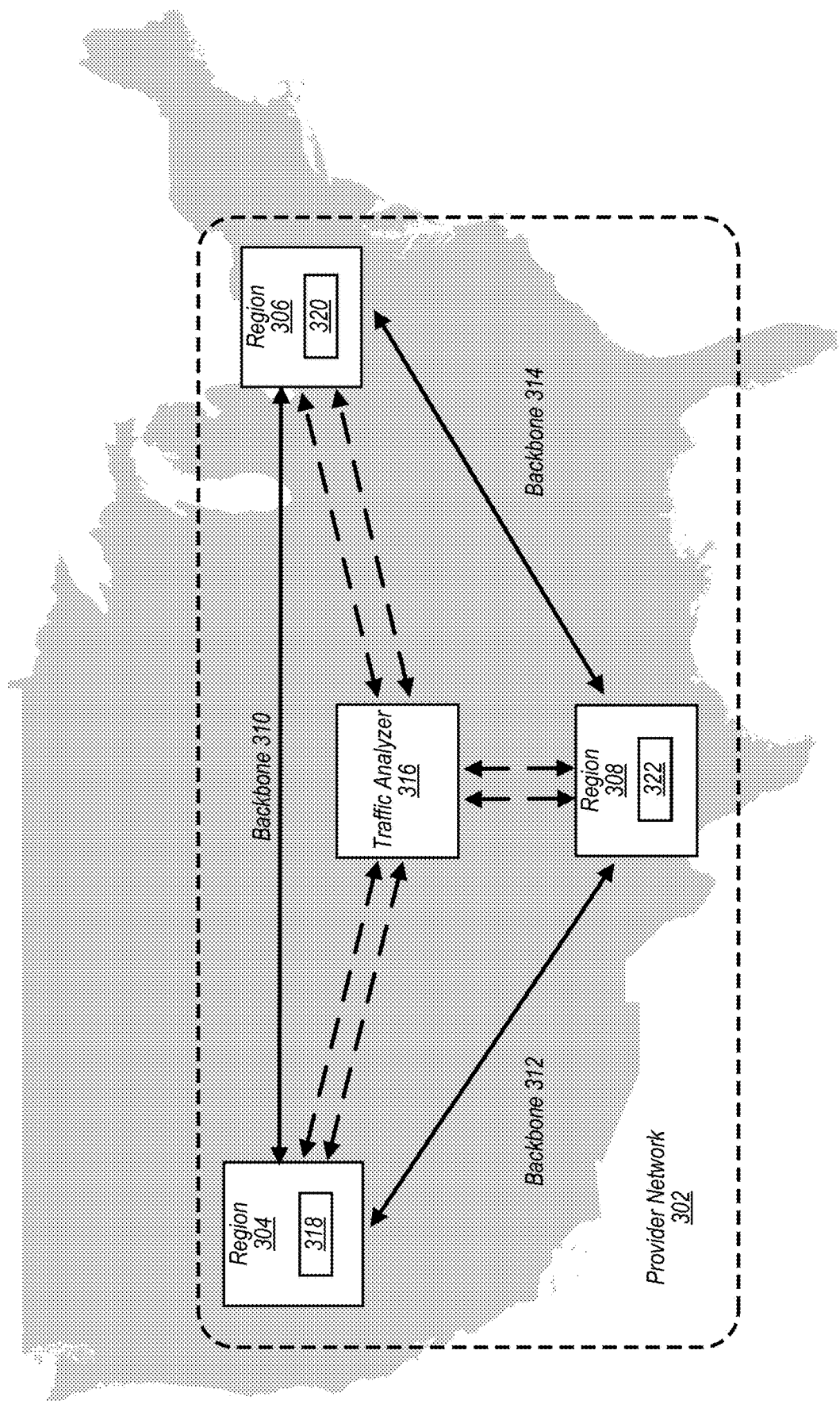
FIG. 3 illustrates a provider network that includes a traffic analyzer that receives traffic information from multiple regions of the provider network and that is configured to determine traffic flowrates on backbone paths of the provider network, according to some embodiments.

FIG. 3 illustrates a provider network that includes a traffic analyzer that receives traffic information from multiple regions of the provider network and that is configured to determine traffic flowrates on backbone paths of the provider network, according to some embodiments.

Provider network 302 includes regions 304, 306, and 308. Inter-region backbone paths 310, 312, and 314 connect regions 304, 306, and 308. Each of regions 304, 306, and 308 may be a region such as region 204 illustrated in FIG. 2. In addition, in some embodiments, each region may include a traffic monitoring system that communicates counter traffic information and/or snapshot traffic flowrate information to a traffic analyzer, such as traffic analyzer 316. In some embodiments, a traffic monitoring system in a region, such as traffic monitoring systems 318, 320, or 322, may be traffic an analyzer such as traffic analyzer 210 that communicates determined network traffic values to traffic analyzer 316. In some embodiments, a traffic monitoring system in a region, such as traffic monitoring systems 318, 320, or 322 may collect traffic counter information and/or snapshot traffic flowrate information and traffic analyzer 316 may determine traffic flowrate values for traffic flowing on various physical network paths in provider network 302 based on the collected traffic counter information and/or snapshot traffic flowrate information. In some embodiments, traffic monitoring systems 318, 320, and 322 may determine traffic flowrate values for traffic flowing on physical network paths within each respective region and traffic analyzer 316 may determine traffic flowrate values for traffic flowing on inter-region backbone paths 310, 312, and 314.

Figure 4A:
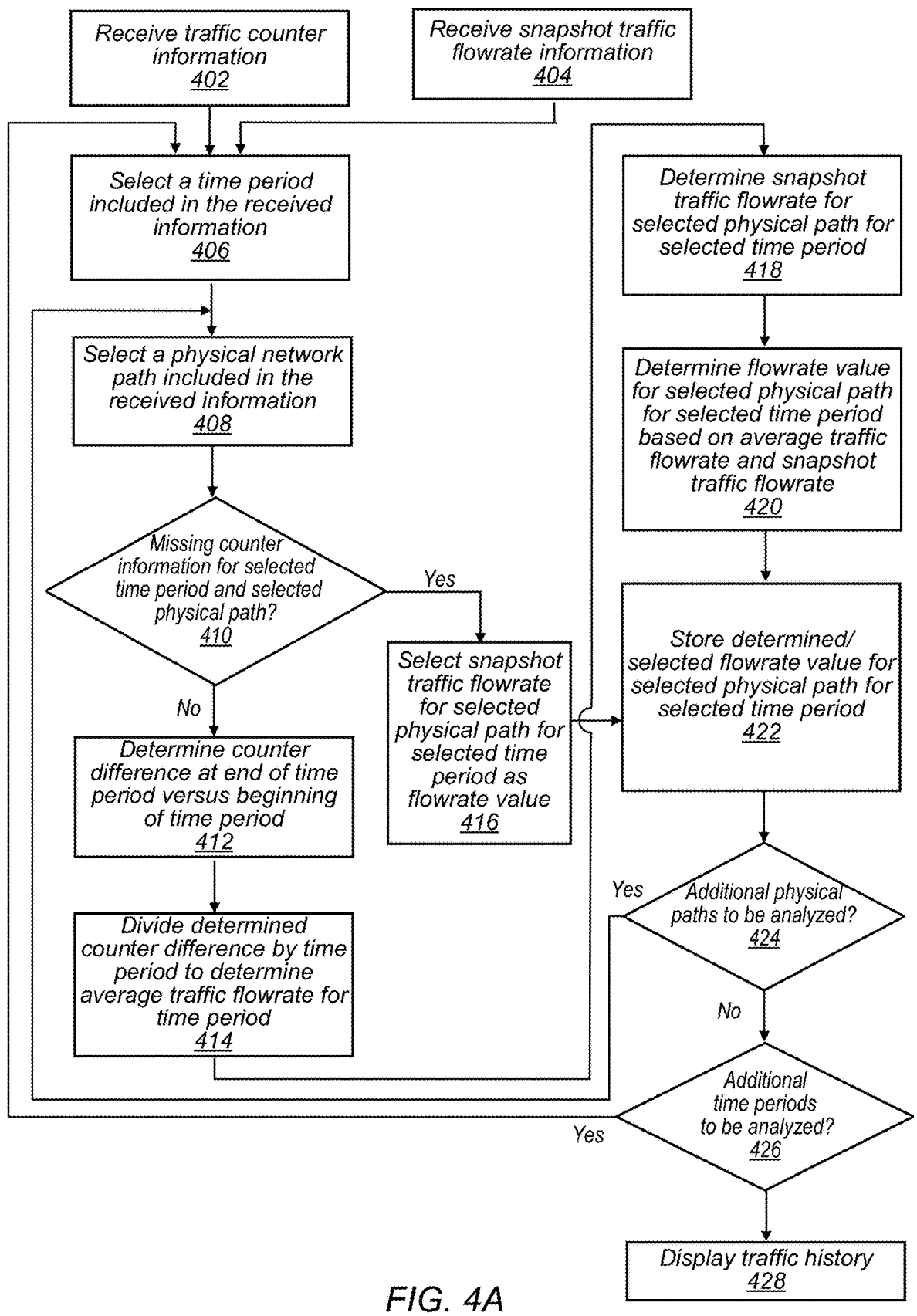
FIG. 4A is a flowchart illustrating a traffic analyzer receiving traffic information from multiple sources, determining traffic flowrates on physical network paths of a provider network, and displaying a traffic history based on the determined traffic flowrates, according to some embodiments.

Example Process for Determining Flowrate Values Based on Multiple Types of Flow Information FIG. 4A is a flowchart illustrating a traffic analyzer receiving traffic information from multiple sources, determining traffic flowrates on physical network paths of a provider network, and displaying a traffic history based on the determined traffic flowrates, according to some embodiments.

At 402 traffic counter information is received from a traffic counter associated with a router and at 404 snapshot traffic flowrate information is received from a traffic meter associated with the router. In some embodiments, traffic counter information may be received as a set of information and snapshot traffic flowrate information may be received as a set of information. In other embodiments, traffic counter information and snapshot traffic flowrate information may be received in sequential responses to a traffic analyzer polling a router for traffic counter information and/or snapshot traffic flowrate information. In some embodiments, traffic counter information and snapshot traffic flowrate information may be received in a sequential order wherein respective snapshot traffic flowrate measurements are received between sequential traffic counter measurements, so that each snapshot traffic flowrate measurement indicates a snapshot traffic flow during a period of time between traffic counter measurements.

At 406 a time period included in the received traffic counter information and the received snapshot traffic flowrate information is selected for determining traffic flowrate values for the selected time period. In some embodiments, a traffic analyzer may determine traffic flowrate values in real time so that the selected time period is the most recent time period or may determine traffic flowrate values based on traffic information stored in a depository of the traffic analyzer, such as storage 150 of traffic analyzer 148.

At 408, a physical network path to be analyzed is selected. A flowrate value for the selected physical network path for the selected time period will be determined as described below. Also, as described below, a traffic analyzer may determine traffic flowrate values for multiple physical network paths, such as any of the backbone paths described in FIGS. 1-3. A traffic analyzer may also determine traffic flowrate values for multiple time periods.

At 410, it is determined if counter information is missing for the selected time period for the selected physical network path. For example, from time to time a counter may be re-set which may cause missing or inaccurate counter information for a particular time period. If it is determined at 410 that traffic counter information is missing for the selected time period for the selected physical network path, at 416 a snapshot traffic flowrate may be used as the traffic flowrate value for the selected time period for the selected physical network path. Otherwise, at 412 a difference is determined for a traffic counter measurement at the beginning of the selected time period and a traffic counter measurement at the end of the selected time period included in the traffic counter information received at 402.

At 414, the determined difference in traffic counter measurements is divided by an amount of time that elapsed between the traffic counter measurements to determine an average traffic flowrate over the period of time.

At 418, the snapshot traffic flowrate for the selected physical network path for the selected time period is determined from the received snapshot traffic flowrate information received at 404. Note that if it is determined at 410 that traffic counter information is missing, determining the snapshot traffic flowrate for the selected physical network path for the selected time period may be performed as part of 416 and steps 412-420 may be omitted.

At 420, a flowrate value for the selected physical network path and the selected time period is determined based on the determined average flowrate based on traffic counter information and based on the determined snapshot traffic flowrate corresponding to the time period. Examples of determining a flowrate value for a selected physical network path and a selected time period based on a determined average traffic flowrate and based on a snapshot traffic flowrate are further discussed in FIGS. 4B and 4C.

At 422, the determined or selected flowrate value for the selected physical network path and for the selected time period is stored in a depository of the traffic analyzer. In some embodiments, a traffic analyzer may determine real time traffic flowrate values and the determined or selected flowrate value may also be displayed at 422.

At 424 it is determined if there are additional physical network paths to be analyzed for the selected time period. If there are additional physical network paths to be analyzed for the selected time period, another physical network path is selected at 408 and the process repeats. If there are not additional physical network paths to be analyzed for the selected time period, at 426 it is determined if there are additional time periods to be analyzed. If there are not additional time periods to be analyzed, a traffic history is displayed at 428. For example a traffic history such as shown in display 142 illustrated in FIG. 1 may be displayed. In some embodiments, step 428 may be omitted.

In response to determining at 426 that there are additional time periods to be analyzed, the process reverts to 406 and another time period is selected. In some embodiments, in which a traffic analyzer operates in real time or near real time, additional traffic counter information and additional snapshot traffic flowrate information may be received between analyzing sequential time periods.

Figure 4B:
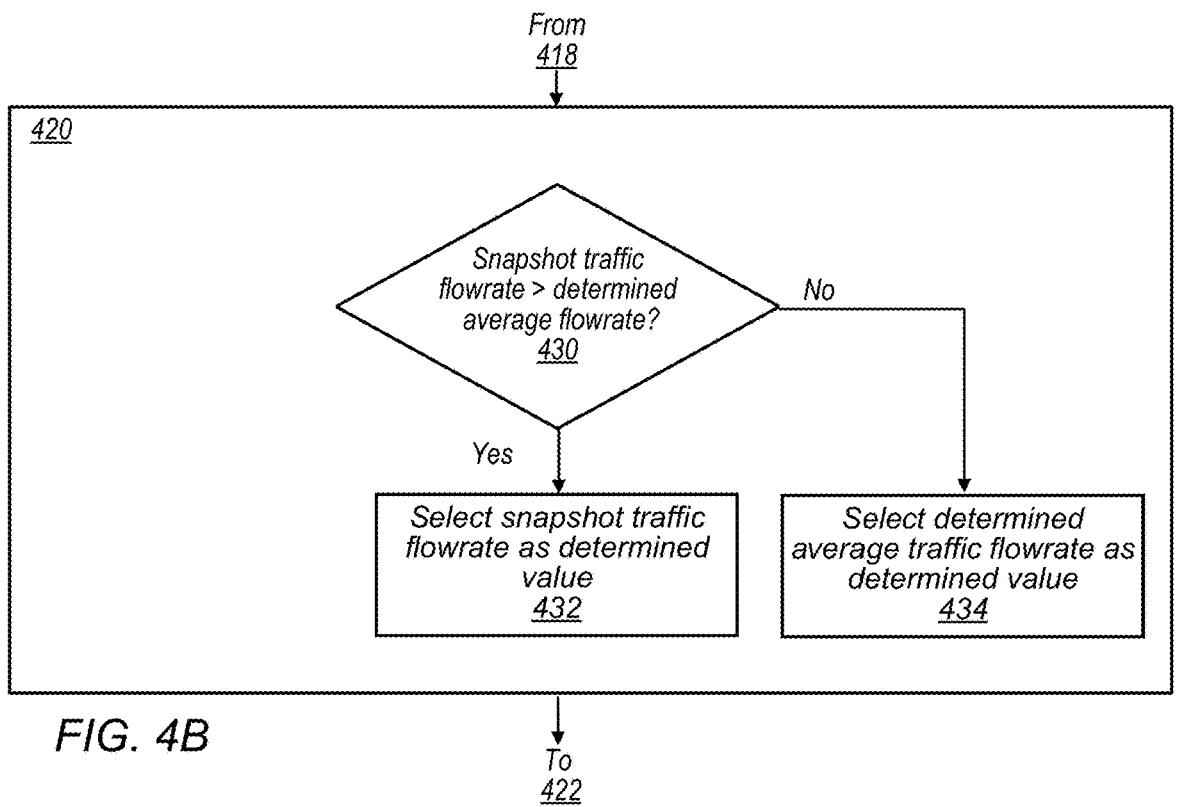
FIG. 4B illustrates an example of determining a flowrate value for a selected physical network path for a selected time period, according to some embodiments.

FIG. 4B illustrates an example of determining a flowrate value for a selected physical network path for a selected time period, according to some embodiments. FIG. 4B illustrates an example of steps that may be involved in step 420 described FIG. 4A.

At 430 it is determined if the snapshot traffic flowrate for the selected physical network path for the selected time period is greater than the determined average flowrate (determined from traffic counter information) for the selected physical network path for the selected time period. If the snapshot traffic flowrate is greater than the average flowrate, then at 432 the snapshot traffic flowrate is selected as the determined flowrate value for the selected physical network path for the selected time period. At 434, if the snapshot traffic flowrate is not greater than the average flowrate, the average flowrate is selected as the determined traffic flowrate value for the selected physical network path for the selected time period. Selecting the greater of the average traffic flowrate and the snapshot traffic flowrate may ensure that a conservative traffic flowrate value is selected. In some embodiments, one or more statistical analysis may be applied to the selected one of the average traffic flowrate or the snapshot traffic flowrate to further increase accuracy of the selected traffic flowrate value. For example, based on previous selected traffic flowrate values or measurements a standard deviation may be computed for traffic flowrate values and the selected traffic flowrate value may be further adjusted to represent a 90%, 95%, 99% confidence interval based on the determined standard deviation (e.g. a P90, P95, or P99 flowrate may be computed).

Figure 4C:
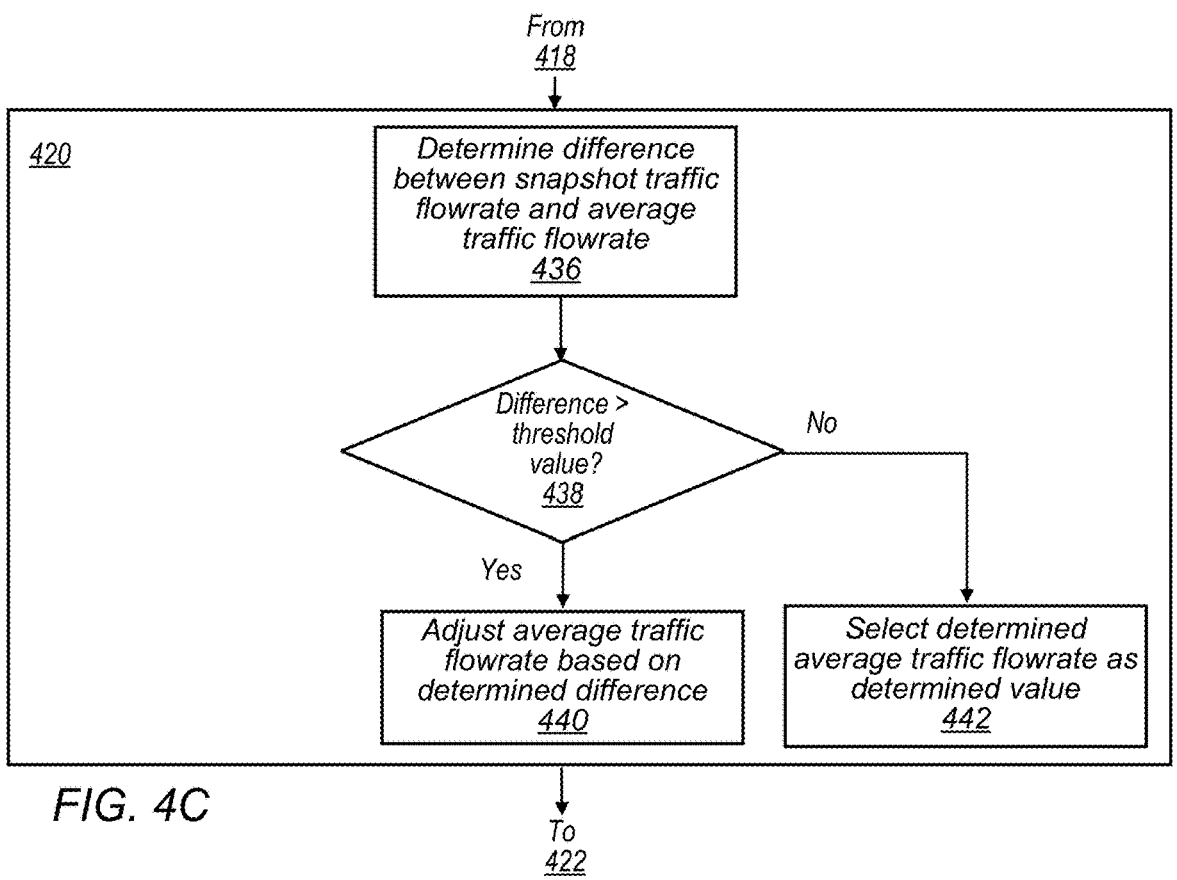
FIG. 4C illustrates an example of determining a flowrate value for a selected physical network path for a selected time period, according to some embodiments.

FIG. 4C illustrates another example of determining a flowrate value for a selected physical network path for a selected time period, according to some embodiments. FIG. 4C illustrates another example of steps that may be involved in step 420 described in FIG. 4A.

At 436 a difference is determined between the snapshot traffic flowrate and the average traffic flowrate determined based on traffic counter measurements. At 438 it is determined if the difference between the average traffic flowrate and the snapshot traffic flowrate exceed a threshold value. If the difference does not exceed a threshold value at 438, at 442 the determined average traffic flowrate is selected as the determined traffic flowrate value for the selected physical network path for the selected period of time. At 440, in response to determining at 438 that the difference between the determined average traffic flowrate and the snapshot traffic flowrate does exceed a threshold value, the average traffic flowrate is adjusted based, at least in part, on the difference between the average traffic flowrate and the snapshot traffic flowrate. For example, if the snapshot traffic flowrate is higher than the average traffic flowrate, the determined value for the traffic flowrate may be a value between the average traffic flowrate and the snapshot traffic flowrate. This approach may be less conservative than the example described in FIG. 4B but may lead to slightly more accurate results because many times the traffic flowrate may vary considerably during the period of time and include peaks and valleys. In some embodiments, one or more statistical analysis may be applied to the average traffic flowrate or the adjusted average traffic flowrate to further increase accuracy of the selected traffic flowrate value. For example, based on previous selected traffic flowrate values or measurements a standard deviation may be computed for traffic flowrate values and the selected traffic flowrate value may be further adjusted to represent a 90%, 95%, 99% confidence interval based on the determined standard deviation (e.g. a P90, P95, or P99 flowrate may be computed).

Example Process for Determining Ratio of Direct Connect Traffic on Backbone Path In addition to determining an overall traffic flowrate on physical network paths in a provider network such as backbone paths and direct connect paths, it may be desirable to determine a percentage of traffic flowing on backbone paths that is related to direct connections between customers of a provider network and the provider network. For example, some customers may be provisioned resources in a data center that are local, i.e. in a same availability zone as a direct connection between the customer's network and the provider network. In such situations, direct connect traffic may flow between the customer's network and the provider network over the local direct connect path and local network paths, but may not leave the local availability zone and may not significantly impact backbone traffic flowrates on backbone paths between availability zones or other non-local backbone paths of the provider network. However, other customers may be provisioned resources in availability zones that are not local to an availability zone in which the customer has a direct connection. In such cases, a significant portion of traffic flow received over a direct connection path between a customer and the provider network may also flow over backbone paths within the provider network to resources of the customer provisioned in availability zones that are not local to the availability zone in which the direct connection is located. Also, for various other reasons traffic received into a provider network via a direct connection path or leaving a provider network via a direct connection path may flow through the provider network via backbone paths within the provider network, such as backbone paths between availability zones, regions, or data centers.

In order to determine how changes to services offered by a provider network may alter traffic flowrates through a provider network, it may be desirable to determine a percentage of direct connect traffic flowing on particular backbone paths of the provider network. For example, a provider network operator may be considering adding a direct connection service at a location that previously did not offer direct connect paths. In order to properly plan for backbone traffic changes due to adding direct connect services at the location, the operator of the provider network may desire to determine what percentage of the added direct connect traffic is anticipated to flow over backbone paths connected with the particular location or on backbone paths throughout the provider network.

At 502, a total traffic flowrate on a particular backbone path that is to be analyzed is determined. This may be referred to in this document as "Backbone-All." For example, in FIG. 2, the backbone path to be analyzed may be intra-region backbone path 234 and an overall traffic flowrate on intra-region backbone path 234 may be determined.

At 504, a total traffic flowrate for traffic flowing into or out of routers that are connected to direct connect paths and that are connected with the particular backbone path being analyzed may be determined. This may be referred to in this document as "Dx-All." For example, in FIG. 2, the direct connect path may be direct connect path 246 and an amount of traffic flowing between direct connect 244 and router 238 of transit center 236 may be determined.

At 506, a percentage of direct connect traffic flowing into or out of the particular backbone path being analyzed from the direct connect routers that are connected to the direct connect paths is determined. This may be referred to in this document as "% Dx." For example, as shown in FIG. 2, direct connect 244 is connected to router 238 in transit center 236 via direct connect path 246. Intra-region backbone path 234 is also connected to router 238. Some direct connect traffic sent or received via direct connect path 246 may be routed to local resources in availability zone 208, while another portion of direct connect traffic sent or received via direct connect path 246 may be routed to resources in availability zone 206 via intra-region backbone path 234.

Based on traffic information from router 238 a percentage of traffic being routed from direct connect path 246 to intra-region backbone path 234 may be determined.

At 508, an amount of direct connect traffic on the particular physical network path being analyzed is determined. This may be referred to in this document as "Dx-Backbone." This amount may be determined by multiplying the overall amount of direct connect traffic, Dx-All, by the percentage of direct connect traffic flowing into or out of the particular backbone path being analyzed, % Dx.

At 510, a ratio of direct connect traffic to overall traffic on the backbone path being analyzed is determined. This may be referred to in this document as "Ratio Dx to All." To determine the ratio of direct connect traffic to all traffic on a particular backbone path being analyzed the direct connect traffic determined to be flowing over the particular backbone path, Dx-Backbone, may be divided by the overall backbone traffic, Backbone-All. For example, in FIG. 2, Ratio Dx may represent a percentage of the traffic flowing on intra-region backbone path 234 that is related to direct connect 244, i.e. originating from or being sent to direct connect 244.

Figure 5:
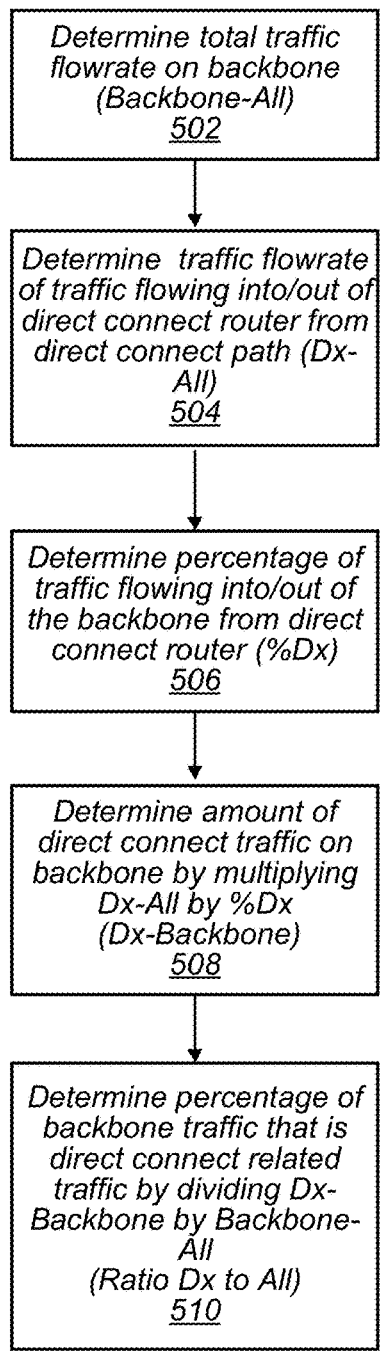
FIG. 5 illustrates a flowchart for determining a ratio of direct connect traffic to overall traffic on a physical network path of a provider network, according some embodiments.

Better understanding the impact of direct connect traffic on backbone paths, such as intra-region backbone path 234, may improve capacity planning and help a provider network make decisions as to what services to offer. In some embodiments, a ratio of a particular type of traffic to an overall amount of traffic flowing on a particular physical network path may be determined for traffic having other characteristics of interest instead of or in addition to direct connect related traffic. For example, in some embodiments, a similar method as described in FIG. 5 may be used to determine a percentage of traffic flowing on a backbone path that is VPN traffic, that is traffic originating or terminating in another availability zone or region of a provider network, or that is traffic comprising various other characteristics of interest.

Example Direct Connect Configuration with Multiple Direct Connect Paths

In some embodiments, customers of a provider network may have multiple direct connect paths between a client network of the customer and a provider network. For example, in FIG. 2 direct connect 244 may be connected to router 232 of transit center 230 in availability zone 206 in addition to router 238 in transit center 236 of availability zone 208.

Figure 6:
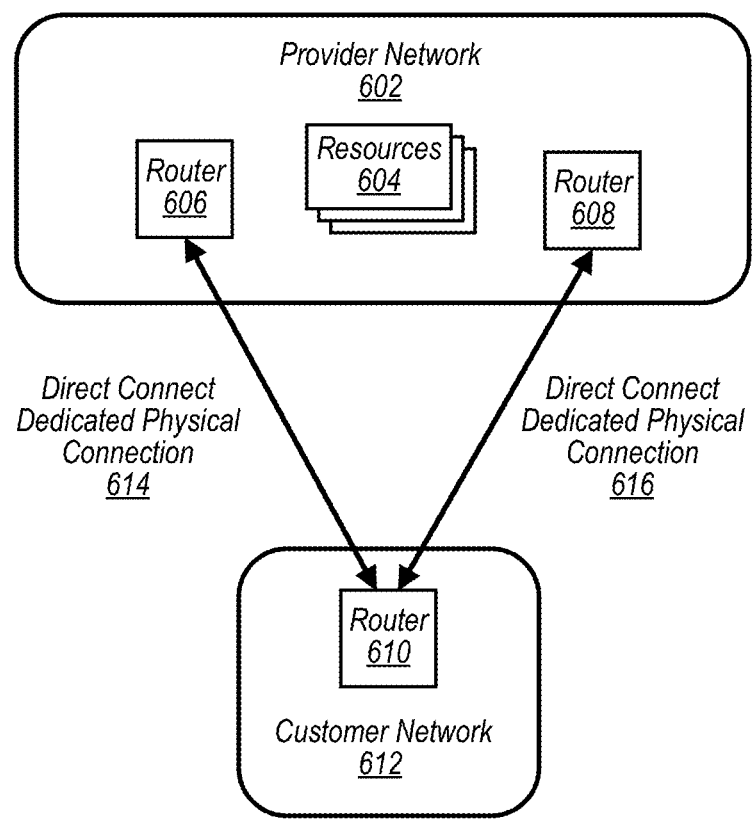
FIG. 6 illustrates an example direct connect customer configuration including multiple physical network paths between a provider network and a customer network, according to some embodiments.

FIG. 6 illustrates an example direct connect customer configuration including multiple physical network paths between a provider network and a customer network, according to some embodiments. Provider network 602, in some embodiments may include components such as illustrated in network 202 in FIG. 2.

Provider network 602 includes resources 604 and routers 606 and 608. Routers 606 and 608 are connected to client router 610 of customer network 612 via direct connect path 614 and direct connect path 616. Redundant direct connect paths between a customer network and a provider network may reduce availability risk, e.g. the risk of a loss of traffic flow between a customer network, such as customer network 612, and a provider network, such as provider network 602. However in some situations, due to system configurations, the benefits of having redundant direct connect paths may not be fully realized. For example, a customer router may be configured to route all or an unbalanced portion of direct connect traffic between a customer network and a provider network over one or more than one direct connect paths and to route none or a small portion of direct connect traffic over another one or more direct connect paths. For customers with such a router configuration a loss of one or more direct connect paths, even though other direct connect paths between the customer network and the provider network remain in service, may cause a loss of traffic flow between the customer network and the provider network or may cause a reduced traffic flowrate. For example, customer router 610 may be configured to route all traffic from customer network 612 to provider network 602 over direct connect path 616. During normal operation this less than ideal configuration may not cause any significant traffic flow issues. However, if there is a failure or reduced capacity related to direct connect path 616 traffic flow between customer network 612 and provider network 602 may be impacted.

In some embodiments, in order to reduce availability risk between a provider network and a customer network, a traffic analyzer, such as any of the traffic analyzers described in FIGS. 1-5, may be configured to identify configuration improvement opportunities and generate a notification with recommendations on how a customer of a provider network could reduce availability risks. In some embodiments, a traffic analyzer may only identify an imbalanced traffic flowrate between redundant direct connect paths and may generate a notification. In such embodiments, the customer may determine how to re-configure the customer's configuration to reduce availability risk. In some embodiments, a customer may work with an operator of a provider network to determine configuration changes to reduce availability risk.

Figure 7:
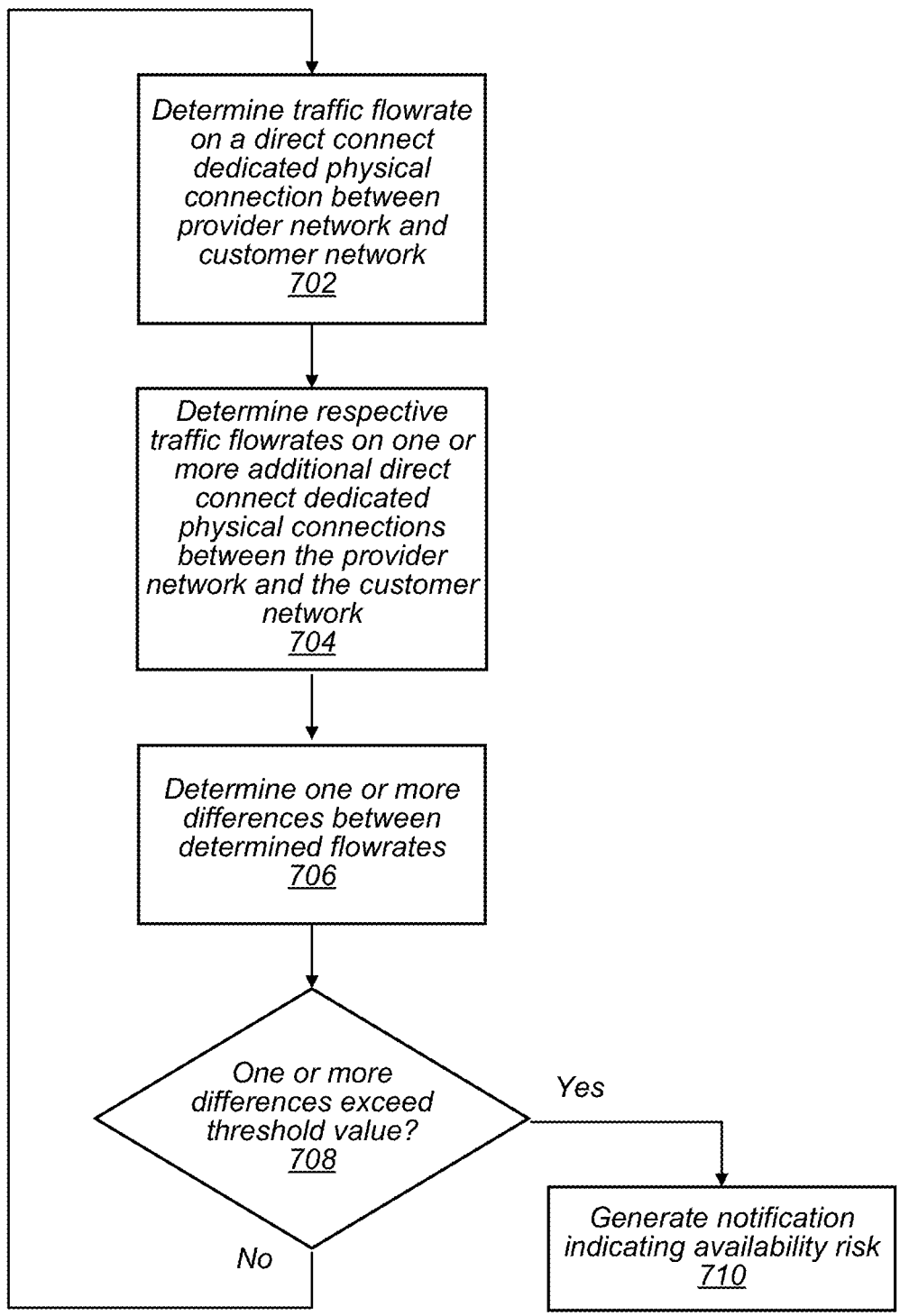
FIG. 7 is a flow chart illustrating a traffic analyzer determining an availability risk and offering recommendations for a customer direct connect configuration, according to some embodiments.

FIG. 7 is a flow chart illustrating a traffic analyzer determining an availability risk and offering recommendations for a customer direct connect configuration, according to some embodiments.

At 702, a traffic flowrate on a direct connect path is determined between a customer network and a provider network. For example a traffic flowrate may be determined for direct connect path 614. A traffic flowrate may be determined for the direct connect path as described in regard to FIGS. 1-5.

At 704, a traffic flowrate is determined for one or more other direct connect paths between the customer network and the provider network. For example a traffic flowrate may be determined for direct connect path 616.

At 706 one or more differences between traffic flowrates on the direct connect path and the one or more other direct connect paths is determined. At 708, it is determined if the differences exceed a threshold value. If the differences in traffic flowrates do not exceed the threshold value than it may be assumed that traffic flow is well balanced across the direct connect paths and configuration changes are not needed to reduce availability risk. However, if one or more of the differences do exceed the threshold value, then at 710 a notification is generated indicating the availability risk. In some embodiments, the notification may include one or more recommendations for improving availability risks, such as reconfiguring a customer router, such as router 610, to more evenly distribute direct connect traffic across the multiple direct connect paths, such as direct connect path 614 and 616.

Figure 8:
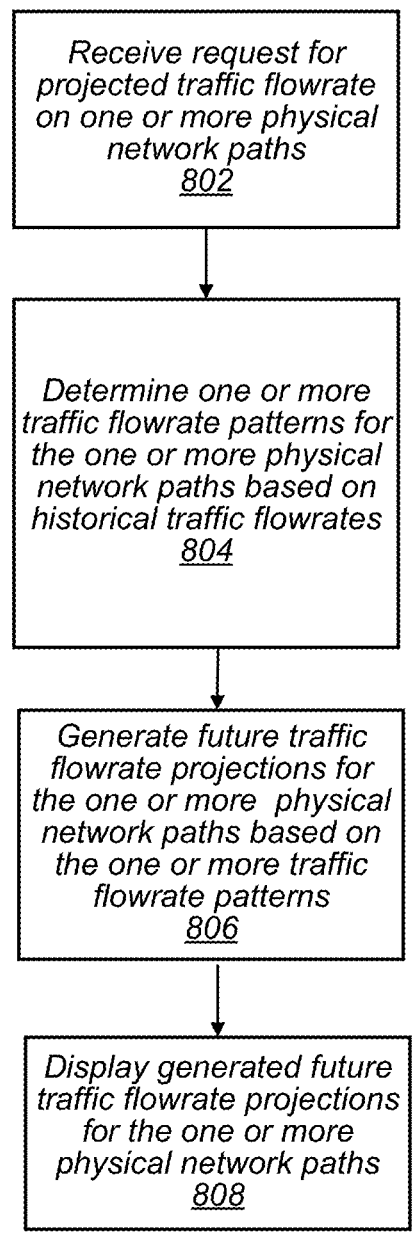
FIG. 8 is a flow chart illustrating a traffic analyzer determining a projected traffic flowrate for one or more physical network paths, according to some embodiments.

Example Process for Generating a Projected Traffic Flowrate for a Particular Physical Path FIG. 8 is a flow chart illustrating a traffic analyzer determining a projected traffic flowrate for one or more physical network paths, according to some embodiments.

At 802 a request to generate one or more projected flowrates for one or more physical network paths is received by a traffic analyzer, such as traffic analyzer 148, 210, 316, or any of the traffic analyzers described in FIGS. 1-7.

In response to receiving the request, at 804 historical traffic flowrates for the one or more physical network paths may be analyzed to determine one or more traffic flowrate trends or patterns. In some embodiments, various suitable data analytical tools may be used to determine traffic flowrate trends or patterns based on the historical traffic data. For example, a curve may be fit to the historical traffic information and an equation for the curve may be used to project future traffic flowrates. However, in some embodiments, other data analysis methods may be used to determine trends or patterns based on historical data.

At 806, future traffic flowrate projections for the one or more physical network paths may be generated based on the determined trends or patterns. For example, if an equation was generated for the physical network path traffic flow based on historical traffic information at step 804, the equation may be used to determine future values by plugging future times into the equation, wherein the determined equation is a function of time.

At 808, the generated future traffic flow projections are generated for display. For example projected traffic flowrates may be displayed in a display such as illustrated in display 142 in FIG. 1. In some embodiments, a display may be implemented by a system separate from a traffic analyzer and the traffic analyzer may provide projected future traffic flowrates and the separate system may organize the information for display.

Illustrative Computer System

Figure 9:
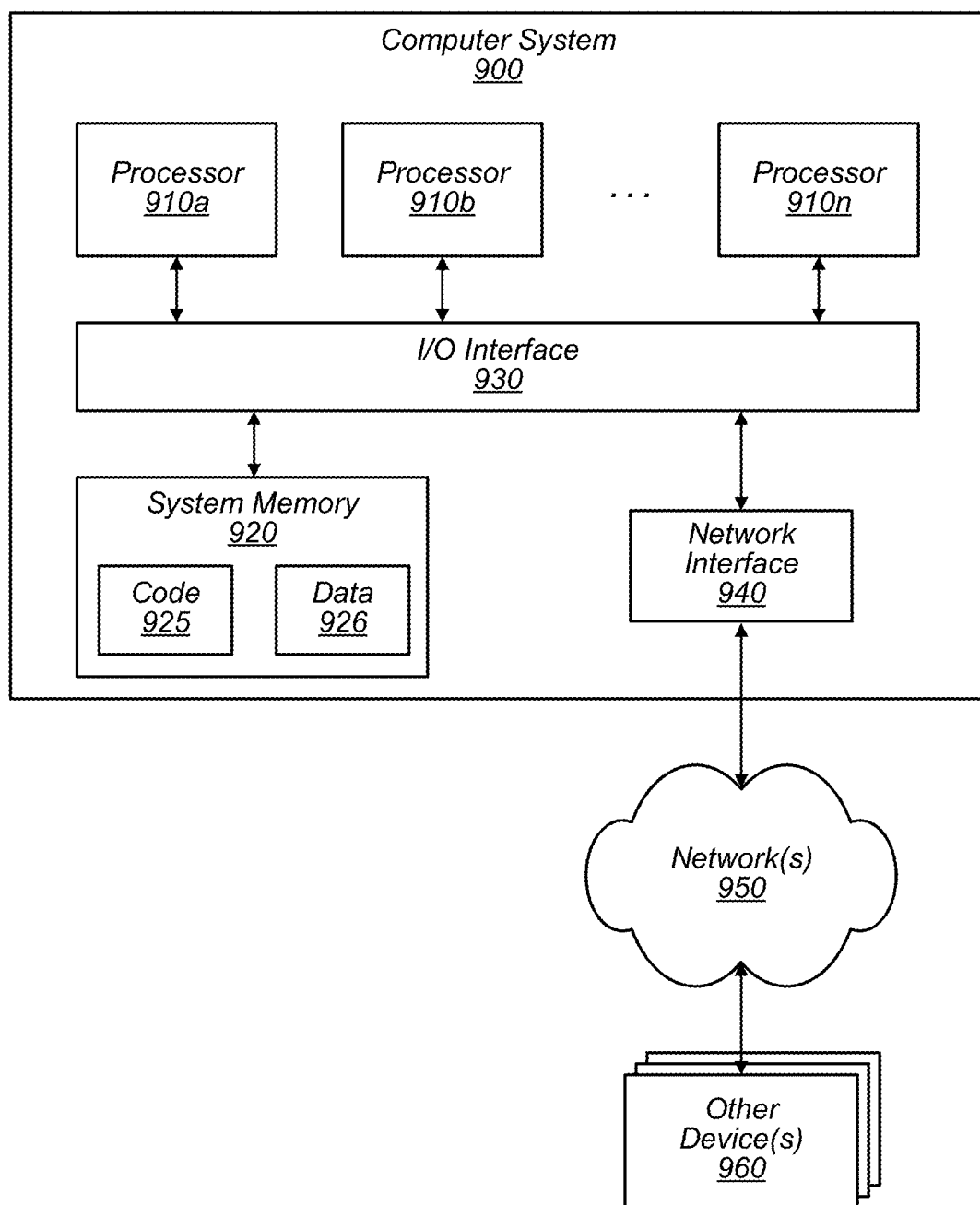
FIG. 9 is a block diagram illustrating an example computer system that may be used in some embodiments.

In at least some embodiments, a traffic analyzer, router or server that implements a portion or all of one or more of the technologies described herein, including the techniques to analyze counter traffic information and snap shot traffic flowrate information to determine traffic flowrates, may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices, such as routers and other computing devices, as illustrated in FIGS. 1 through 8, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIGS. 1 through 8 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system comprising:
   a network comprising:
   a plurality of network devices;
   a plurality of physical network paths each connecting respective sets of the plurality of network devices; and
   one or more computing devices implementing a traffic analyzer configured to:
   receive a first set of traffic information from one or more of the plurality of network devices, wherein the first set of traffic information comprises metered traffic flow measurements for traffic flowing via one or more of the plurality of physical network paths;
   receive a second set of traffic information from the one or more network devices, wherein the second set of traffic information comprises snapshot traffic flow measurements for the traffic flowing via the one or more physical network paths;
   wherein the metered network traffic flow measurements and the snapshot network traffic flow measurements comprise different types of network traffic flow measurements of the traffic flowing via the one or more physical network paths;
   determine, for a given time interval and for respective ones of the plurality of physical network paths, respective amounts of network traffic flowing via the respective one or more physical network paths based on the first and second sets of traffic information; and
   generate, for display or storage, respective values for the respective amounts of network traffic flowing via the respective one or more physical network paths.

2. The system of claim 1, wherein the metered traffic flow measurements comprise:
   a series of sequentially measured cumulative traffic flow measurements from respective traffic counters associated with respective ones of the one or more network devices, wherein each traffic counter measures a cumulative amount of network traffic that has passed into or out of the respective network device associated with the respective traffic counter via a particular one of the one or more physical network paths, wherein each of the sequentially measured cumulative traffic flow measurements is separated from a preceding cumulative traffic flow measurement by a period of time; and
   wherein the snapshot traffic flow measurements comprise:
   one or more instantaneous traffic flowrate values collected from respective traffic meters associated with respective ones of the one or more network devices during the period of time between sequential cumulative traffic flow measurements, wherein the instantaneous traffic flowrate values indicate a current traffic flowrate at a point in time.

3. The system of claim 1, wherein the network further comprises:
   a plurality of data centers;
   wherein respective ones of the plurality of network devices are included in respective ones of the data centers;
   wherein the plurality of physical network paths connect respective ones of the data centers with each other via the network devices included in the respective ones of the data centers; and
   wherein the traffic analyzer is further configured to determine respective amounts of network traffic flowing between the respective ones of the plurality of data centers via the physical network paths connecting the respective ones of the plurality of data centers.

4. The system of claim 3, wherein the network further comprises:
   a plurality of availability zones, wherein each of the plurality of availability zones comprises one or more of the plurality of data centers; and
   a transit center, wherein each of the one or more data centers of each of the plurality of availability zones is connected to the transit center via respective ones of the networking devices in the one or more data centers, a networking device of the plurality of networking devices located in the transit center, and receptive ones of the plurality of physical network paths connecting respective ones of the one or more data centers with the transit center,
   wherein the traffic analyzer is further configured to determine respective network traffic flowrates of network traffic flowing between respective ones of the availability zones via the transit center.

5. The system of claim 4, wherein at least one of the one or more physical network paths is a dedicated private physical network path between one of the one or more network devices of the network and a networking device of a customer of a provider service that operates the network;
   wherein the traffic analyzer is further configured to determine a network traffic flowrate of network traffic flowing between the at least one network device of the network and the network device of the customer via the dedicated private physical network path.

6. A traffic analyzer, comprising:
   one or more computing devices configured to:
   receive a first set of traffic information from a set of one or more network devices of a network, wherein the first set of traffic information comprises metered traffic flow measurements for traffic flowing via one or more physical network paths of the network;
   receive a second set of traffic information from the set of one or more network devices, wherein the second set of traffic information comprises snapshot traffic flow measurements for the traffic flowing via the one or more physical network paths of the network;
   wherein the metered network traffic flow measurements and the snapshot network traffic flow measurements comprise different types of traffic flow measurements of the traffic flowing via the one or more physical network paths of the network;
   determine, for a given time interval and for respective ones of the one or more physical network paths, respective amounts of network traffic flowing via the respective one or more physical network paths of the network based on the first set of traffic information and based on the second set of traffic information; and
   generate, for display or storage, values for the respective amounts of network traffic flowing via the respective physical network paths for the given time interval.

7. The traffic analyzer of claim 6, wherein the metered traffic flow measurements comprise:
a series of two or more cumulative traffic flow measurements from respective traffic counters associated with the set of one or more network devices, wherein each traffic counter measures a cumulative amount of traffic that has passed through the network device associated with the traffic counter, wherein each of the two or more cumulative traffic flow measurements are separated by a period of time.

8. The traffic analyzer of claim 7, wherein the snapshot traffic flow measurements comprise:
one or more instantaneous traffic flowrate values collected from respective traffic meters associated with respective ones of the set of one or more network devices during the period of time between cumulative traffic flow measurements, wherein the instantaneous traffic flowrate values indicate a current traffic flowrate at a point in time.

9. The traffic analyzer of claim 8, wherein to determine, for the given time interval and for the respective ones of the one or more physical network paths, the respective amounts of network traffic flowing via the respective physical network paths based on the first and second sets of traffic information, the one or more computing devices are further configured to, for the given time interval and for the particular physical network path:
determine an average traffic flowrate value based on a difference between cumulative traffic flow measurements of the series of cumulative traffic flow measurements and based on the period of time that separates the cumulative traffic flow measurements; and
select a greater one of the average traffic flowrate value or the instantaneous traffic flowrate value as a traffic flowrate value for the particular physical path for the given interval of time;
wherein the value generated for display or storage for the particular physical path for the given time interval is the selected greater one of the average traffic flowrate value or the instantaneous traffic flowrate value.

10. The traffic analyzer of claim 8, wherein to determine, for the given time interval and for the respective ones of the one or more physical network paths, the respective amounts of network traffic flowing via the respective physical network paths based on the first and second sets of traffic information, the one or more computing devices are further configured to, for the given time interval and for the particular physical network path:
determine an average traffic flowrate value based on a difference between cumulative traffic flow measurements of the series of cumulative traffic flow measurements and based on the period of time that separates the cumulative traffic flow measurements;
determine a difference between the average traffic flowrate value and the instantaneous traffic flowrate value; and
adjust the average traffic flowrate value based, at least in part, on the difference between the average traffic flowrate value and the instantaneous traffic flowrate value;
wherein the value generated for display or storage for the particular physical path for the given time interval is the adjusted average traffic flowrate value.

11. The traffic analyzer of claim 6, wherein the one or more computing devices are further configured to:
determine one or more missing traffic flow measurements in the first set of traffic information or in the second set of traffic information; and
determine, for a particular time interval and for a particular physical network path that corresponds to one of the missing traffic flow measurements, an amount of network traffic flowing via the particular physical network path for the particular time interval based on traffic flow measurements included in one of the sets of network traffic information that is not the set of traffic information missing the one or more missing traffic flow measurements.

12. The traffic analyzer of claim 6, wherein the first set and the second set of traffic information comprise traffic information for traffic flowing via one or more backbone network paths within a provider network and traffic information for traffic flowing via one or more direct connect dedicated physical connection paths between a border router of the provider network and a networking device of a customer of the provider network,
wherein the one or more computing devices are further configured to:
determine, for a given time interval and for respective ones of the one or more backbone network paths, respective amounts of direct connect related network traffic flowing via the respective ones of the one or more backbone network paths, wherein the respective amounts of direct connect related network traffic comprise traffic directed to or coming from the one or more direct connect dedicated physical connection paths between the border router of the provider network and the networking device of the customer of the provider network.

13. The traffic analyzer of claim 6, wherein the first set and the second set of traffic information comprise traffic information for traffic flowing via multiple direct connect dedicated physical connection paths between one or more border routers of the provider network and one or more networking devices of a customer of the provider network,
wherein the one or more computing devices are further configured to:
determine an availability risk for the multiple direct connect dedicated physical connection paths between the provider network and the one or more networking devices of the customer, wherein the availability risk indicates a risk of communication loss between the provider network and the customer; and
in response to the availability risk exceeding a threshold, generate an indication related to the availability risk for the multiple direct connect dedicated physical connection paths.

14. The traffic analyzer of claim 6, wherein the first set and the second set of traffic information are received from regional traffic monitoring systems of the network, wherein the network comprises a provider network comprising multiple regions.

15. The traffic analyzer of claim 6, wherein the plurality of networking devices comprise a plurality of routers of the network, and wherein the one or more computing devices are further configured to:
poll the plurality of routers of the network to collect the first set and the second set of traffic information.

16. The traffic analyzer of claim 6, wherein the one or more computing devices are further configured to:
project, based at least in part on the determined respective amounts of network traffic, one or more future amounts of traffic projected to flow via the one or more respective physical network paths; and generate for display the one or more future amounts of traffic projected to flow via the one or more respective physical network paths.

17. A method comprising:

receiving a first set of traffic information from a set of one or more network devices of a network, wherein the first set of traffic information comprises metered traffic flow measurements for traffic flowing through one or more physical network paths;

receiving a second set of traffic information from the set of one or more network devices, wherein the second set of traffic information comprises snapshot traffic flow measurements for the traffic flowing through the one or more physical network paths;

wherein the metered network traffic flow measurements and the snapshot network traffic flow measurements comprise different types of traffic flow measurements for the traffic flowing through the one or more physical network paths;

determining, for a given time interval and for respective ones of the one or more physical network paths, respective amounts of network traffic flowing via respective ones of the one or more physical network paths based on the first set of traffic information and based on the second set of traffic information.

18. The method of claim 17, wherein the metered traffic flow measurements comprise:

a series of two or more cumulative traffic flow measurements from traffic counters associated with the set of one or more network devices, wherein each traffic counter measures a cumulative amount of traffic that has passed through the traffic counter, wherein each of the two or more cumulative traffic flow measurements are separated by a period of time; and wherein the snapshot traffic information comprise:

one or more traffic flowrate values collected from a traffic meter associated with the set of one or more network devices during the period of time, wherein the traffic flowrate values indicate a current traffic flowrate.

19. The method of claim 17 wherein the one or more physical network paths comprise a plurality of physical network paths, wherein the method further comprises:

receiving a request for traffic analysis for a type of traffic of interest flowing on a particular physical network path, wherein the type of traffic of interest comprises one or more characteristics of interest; and determining, for a given time interval and for the particular network path, an amount of network traffic flowing over the particular physical network path that comprises the particular type of traffic of interest.

20. The method of claim 19, further comprising:

projecting, based at least in part on the determined respective amounts of network traffic, one or more future amounts of network traffic projected to flow via the respective ones of the one or more physical network paths.

21. The method of claim 17, wherein the first set and the second set of traffic information comprise traffic information for traffic flowing via multiple direct connect dedicated physical connection paths between one or more border routers of the provider network and one or more networking devices of a customer of the provider network, wherein the method further comprises:

determining an availability risk for the multiple direct connect dedicated physical connection paths between the provider network and the one or more networking devices of the customer, wherein the availability risk indicates a risk of communication loss between the provider network and the customer; and in response to the availability risk exceeding a threshold, generating an indication related to the availability risk for the multiple direct connect dedicated physical connection paths.

22. The method of claim 17, further comprising:

projecting, based at least in part on the determined respective amounts of network traffic, one or more future amounts of traffic projected to flow via the one or more respective physical network paths; and generating for display the one or more future amounts of traffic projected to flow via the one or more respective physical network paths.

* * * * *